United States Patent [19]

Ogasawara

[11] 4,238,782

[45] Dec. 9, 1980

[54] DEVICE FOR MEASURING THE AMOUNT OF MOVEMENT OF A MOVING OBJECT

[76] Inventor: Hiroomi Ogasawara, 3821-4, Yamakita, Yamakitamachi, Ashigarakami-gun, Kanagawa-ken, Japan

[21] Appl. No.: 32,817

[22] Filed: Apr. 24, 1979

[30] Foreign Application Priority Data

Apr. 26, 1978 [JP] Japan .................................. 53-49605

[51] Int. Cl.³ ...................... G08C 19/16; G01R 27/26
[52] U.S. Cl. .............................. 340/870.37; 324/61 R; 340/347 P
[58] Field of Search ..................... 340/200, 539, 347 P, 340/177 R; 324/61 R, 61 P, 61 QS

[56] References Cited

U.S. PATENT DOCUMENTS

| | | | |
|---|---|---|---|
| 2,675,540 | 4/1954 | Schultheis, Jr. ..................... | 340/539 |
| 3,221,256 | 11/1965 | Walden ................................ | 340/200 |
| 3,227,952 | 1/1966 | Proebster et al. . | |
| 3,487,402 | 12/1969 | Hillhouse ............................. | 340/200 |
| 3,702,467 | 11/1972 | Melnyk ................................. | 340/200 |
| 3,723,866 | 3/1973 | Michand et al. ..................... | 340/200 |
| 3,860,918 | 1/1975 | Cencel . | |
| 3,938,077 | 2/1976 | Nakanishi et al. ................... | 340/539 |
| 3,990,005 | 11/1976 | Abbe et al. . | |

*Primary Examiner*—Thomas A. Robinson
*Attorney, Agent, or Firm*—Beveridge, DeGrandi, Kline & Lunsford

[57] ABSTRACT

A device for measuring the amount of movement of a moving object is provided with a sensor unit made up of the moving object and stationary members arranged to form two capacitors therebetween. The confronting surfaces of the moving object and stationary members are graduated with gear-like cuts so that while the capacitance of one capacitor is maximum, the capacitance of the other capacitor is minimum. The device further comprises a pair of oscillators coupled to the two capacitors, and a mixer connected to the oscillators so that the difference in capacitance between the capacitors is obtained as the difference in frequency, which is processed to provide the amount of movement of the moving object.

5 Claims, 7 Drawing Figures

DEVICE FOR MEASURING THE AMOUNT OF MOVEMENT OF A MOVING OBJECT

BACKGROUND OF THE INVENTION

This invention relates to a device for electrically measuring the amount of movement of a moving object including a rotating object and a linearly moving object.

For instance, the amount of rotation of a rotating object can be, in general, detected by a method in which the rotating object is graduated in equal spaces, and the amount of rotation of the rotating object is obtained by reading the graduations. In another method, the confronting surfaces of a rotating object and a stationary member have gear-like cuts as graduations, so that as the protrusions of the gear-like cuts are moved close to and away from one another with the rotation of the rotating object the capacitance of a capacitor formed thereby is changed, and the variation of the capacitance is detected to measure the amount of movement.

In the case where the amount of rotation should be read with high precision, it is assumed that the reading is effected by the second, i.e., by the unit of 1/3600 of one degree. Then, the periphery of the rotating object must be graduated by dividing it into $1,296,000 = 360 \times 60 \times 60$.

However, such division is practically impossible. Accordingly, a device for measuring the amount of movement with high accuracy has not been proposed heretofore.

SUMMARY OF THE INVENTION

Accordingly, a first object of this invention is to provide a device which is capable of measuring the amount of rotation of a rotating object with a high accuracy of the order of less than one second.

A second object of the invention is to provide a device which can accurately and quickly measure the amount of movement of a moving object irrespective of the speed of the moving object.

A third object of the invention is to provide a device for measuring the amount of movement of a moving object, in which a signal corresponding linearly to the relative movement of the moving object and stationary members can be obtained.

A fourth object of the invention is to provide a device for measuring the amount of movement of a moving object, in which a supplied measurement signal is transmitted by wireless communication.

A fifth object of the invention is to provide a device for measuring the amount of movement of a moving object, in which a measured signal is provided as a desired frequency signal.

The novel features which are considered characteristic of this invention are set forth in the appended claims. This invention itself, however, as well as other objects and advantages thereof will be more apparently understood by reference to the following detailed description of illustrative embodiments, when read in conjunction with the accompanying drawings.

Figure 2:
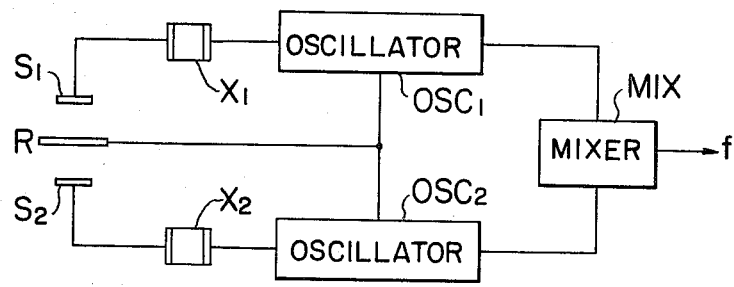
FIG. 2 is a block diagram showing one example of a circuit employed in the device according to the invention.
Figure 3:
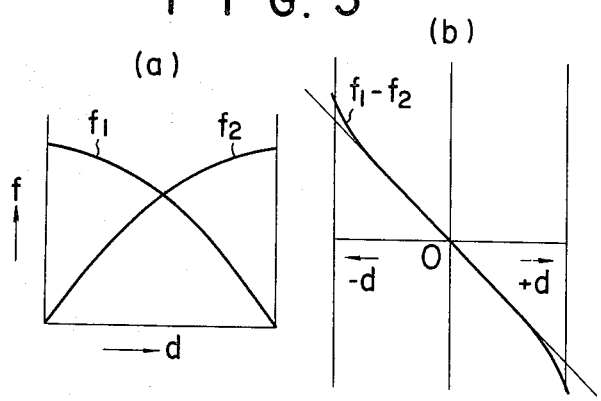
Figure 4:
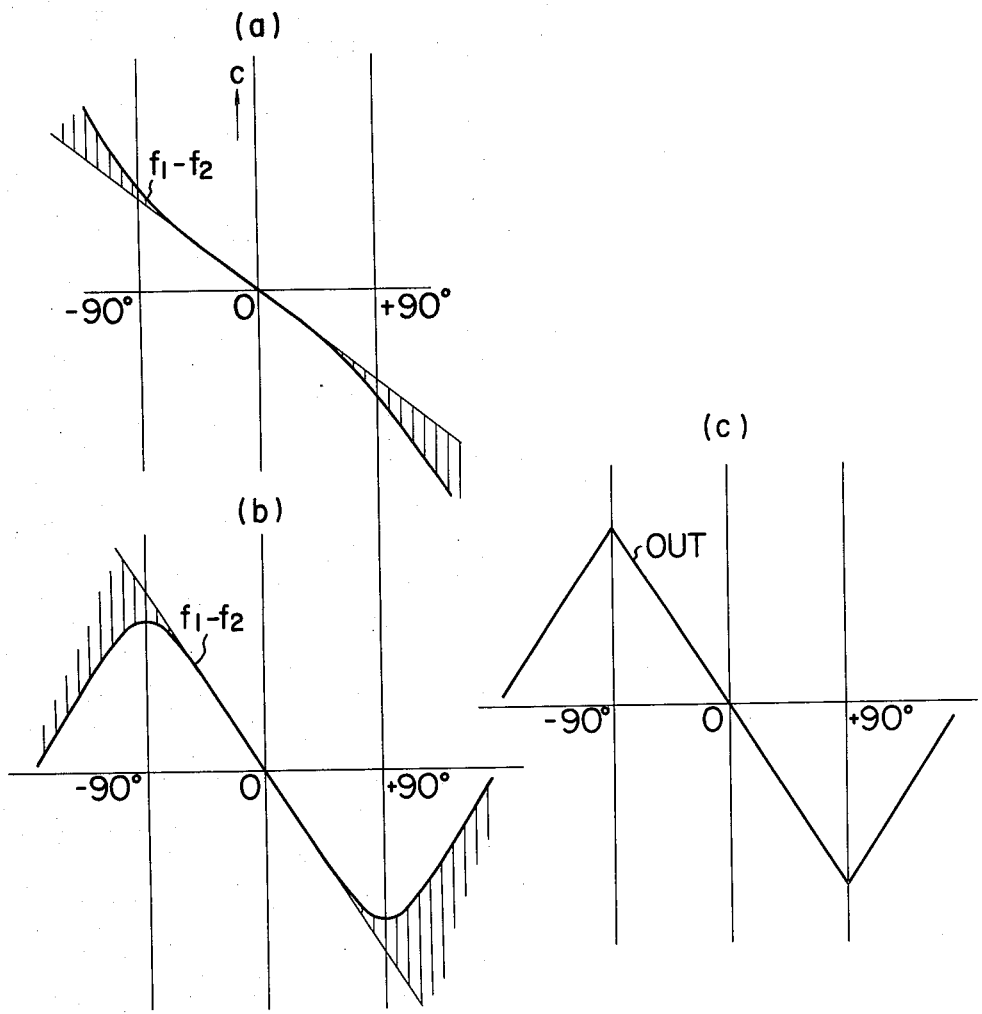
Figure 5:
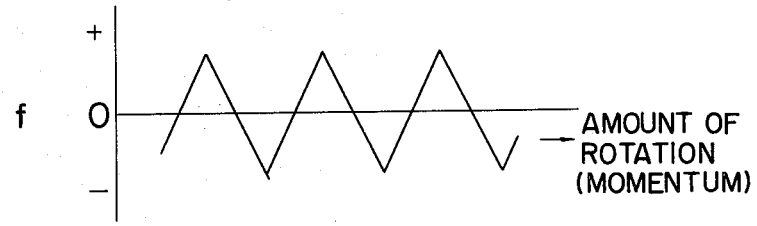
Figure 6:
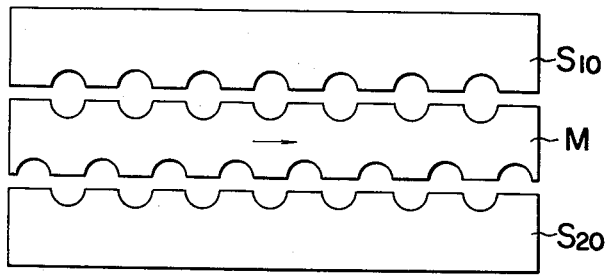
Figure 7:
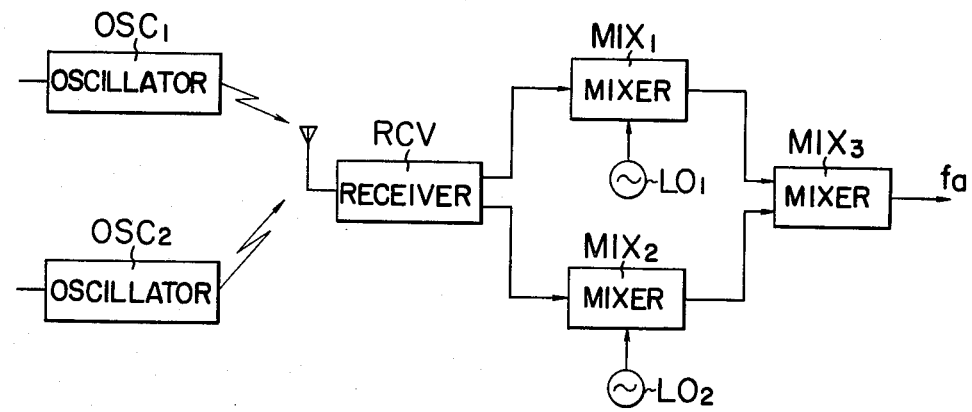

The parts (a) and (b) of FIG. 3 and the parts (a), (b) and (c) of FIG. 4 are graphical representations for a description of the operation of the device according to the invention;

FIG. 5 is also a graphical representation indicating the output characteristic of the circuit shown in FIG. 2;

FIG. 6 is an explanatory diagram showing another example of the sensor unit; and FIG. 7 is a block diagram showing another example of the circuit employed in the device according to the invention.

DETAILED DESCRIPTION OF THE INVENTION

Figure 1:
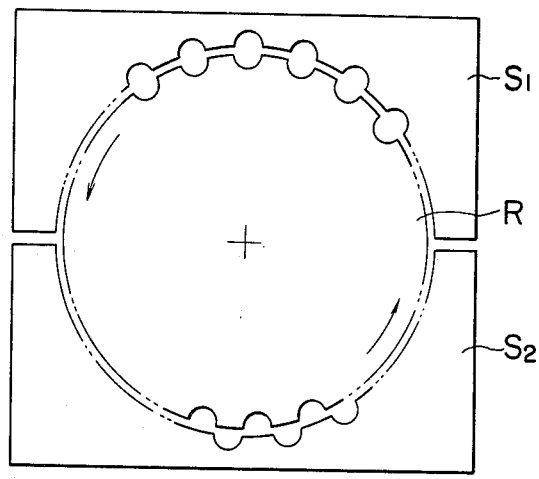
FIG. 1 is an explanatory diagram showing one example of a sensor unit of a device for measuring the amount of movement of a moving object according to the invention.

FIG. 1 shows one example of a sensor unit in one preferred example of a device for measuring the amount of movement of a moving object according to this invention. In FIG. 1, reference character R designates an object to be measured, or a rotating object which rotates in synchronization with the aforementioned object to be measured. The peripheral portion of the rotating object is graduated with gear-like cuts in equal spaces. Two stationary members $S_1$ and $S_2$ surround the rotating object. The edges of these stationary members $S_1$ and $S_2$ which confront the periphery of the rotating object are marked out with gear-like cuts in spaces equal to those of the rotating object R. However, it should be noted that the relation of the cuts on the rotating object R and the cuts on the stationary member $S_1$ is shifted by 180° in phase from the relation of the cuts on the rotating object R and the cuts on the stationary member $S_2$. In other words, if it is assumed that the portions of the edge, which are not cut or recessed, of the stationary member $S_1$ (hereinafter referred to as "the protrusions of the edge" when applicable) coincide with the protrusions of the edge of the rotating object R, then the protrusions of the edge of the stationary member $S_2$ coincide with the recesses of the edge of the rotating object R. Accordingly, is it considered that the rotating object R and the stationary member $S_1$ form one capacitor and the rotating object R and the stationary member $S_2$ form another capacitor, then when the capacitance of the capacitor formed by the rotating object R and the stationary member $S_1$ is the maximum, the capacitance of the capacitor formed by the rotating object R and the stationary member $S_2$ is the minimum.

FIG. 2 shows one example of a circuit used in combination with the sensor unit shown in FIG. 1. In the circuit, crystal resonators $X_1$ and $X_2$ are used in combination with oscillators $OSC_1$ and $OSC_2$, respectively. Originally, the oscillating frequency of a crystal resonator is fixed. The variations in capacitance of the capacitors are of a so-called "differential variation", in which while the capacitance of one capacitor is increased, the capacitance of the other capacitor is decreased. Accordingly, while the oscillating frequency of one of the oscillators $OSC_1$ and $OSC_2$ is increased, that of the other is decreased. If these two frequency signals are mixed with each other in a mixer MIX, then the difference frequency f between them can be obtained. The difference signal is transmitted to a signal processing circuit by wire or wireless communication.

The parts (a) and (b) of FIG. 3 are graphical representations indicating the outputs of the oscillators $OSC_1$ and $OSC_2$ and the output of the mixer MIX, which are provided as the rotating object R is rotated with respect to the stationary members $S_1$ and $S_2$. For convenience in description, a relative average distance d between the rotating object R and the stationary members $S_1$ and $S_2$ will be employed. As the rotating object R is rotated approximately one graduation with respect to the stationary members $S_1$ and $S_2$, the output frequencies $f_1$ and $f_2$ of the oscillators $OSC_1$ and $OSC_2$ change non-linearly as indicated in the part (a) of FIG. 3. It should be noted that the variations of the output frequencies $f_1$ and $f_2$ are symmetrical. If a characteristic curve $(f_1-f_2)$ is obtained from the variations of the output frequencies, then it includes a substantially linear portion as indicated in the part (b) of FIG. 2.

The parts (a) through (c) of FIG. 4 are to indicate the fact that if the non-linear portion of a substantially linear characteristic curve (the part (a) of FIG. 4) obtained by the differential operation between a movable electrode and stationary electrodes is superposed on a substantially sinusoidal characteristic curve (the part (b) of FIG. 4) obtained by the rotation of the rotating object with respect to the stationary members, a characteristic curve which is linear in a range of from $+90°$ to $-90°$ and is a triangular wave characteristic curve as a whole can be obtained.

The configuration of the substantially sinusoidal characteristic curve can be changed optionally to some extent by suitably selecting the size of the rotating object R and the stationary members $S_1$ and $S_2$ and the distance between the electrodes. Thus, the triangular wave characteristic curve shown in the part (c) of FIG. 4 can be obtained by superposing the substantially sinusoidal characteristic curve on the end portions of the substantially linear characteristic curve which end portions are greatly deviated from the straight line. The triangular wave characteristic curve has an inflection point every predetermined rotation angle, and therefore can be used for the detection of a rotation angle in which the linear portion of the waveform is utilized, and for the detection of rotation in which the rise and fall portions of the waveform are utilized.

FIG. 5 shows the continuous variation of the difference frequency signal f with the rotation of the rotating object R. As the rotating object rotates, the difference frequency is increased at a graduation pitch, but it is decreased at the next graduation pitch. It is necessary to linearly increase and decrease the frequency. This can be achieved by suitably selecting the configurations of the gear-like cut, i.e., the recesses and protrusions of the rotating object R and the stationary members $S_1$ and $S_2$.

As the frequency is repeatedly increased and decreased linearly, one graduation pitch can be divided into equal parts, Accordingly, the reading can be accomplished with much more precision that that of the graduation pitch. For instance, it is assumed that the graduation pitch is of a unit of one degree. If, in this case, this graduation pitch is divided into one hundred parts, then the reading can be made by the unit of 0.6 second. If the graduation pitch can be divided into more parts, then the pitch intervals can be made to be longer.

FIG. 6 shows another example of the sensor unit according to the invention, which is provided for a linearly moving object. The sensor unit is similar to that shown in FIG. 1 with the exception that a moving object M and stationary members $S_{10}$ and $S_{20}$ are so constructed that they are suitable for linear movement.

FIG. 7 shows another method of processing the outputs of the oscillators $OSC_1$ and $OSC_2$. The outputs of the two oscillators $OSC_1$ and $OSC_2$ are applied through one receiver RCV to mixers $MIX_1$ and $MIX_2$, where they are mixed with local oscillation frequencies $LO_1$ and $LO_2$ for frequency conversion, respectively. The output signals of the mixers are mixed with each other in a mixer $MIX_3$, to obtain a measurement signal fa.

The problems that, when the difference between the output frequencies of the oscillators $OSC_1$ and $OSC_2$ is several KHz, the signal interval is 0.2 to 0.3 millisecond, which is too great to follow the movement of a continuously moving object, and when a frequency of 10 to 20 MHz, readily obtained as the output frequencies of the oscillators $OSC_1$ and $OSC_2$, is used, the frequency is unsuitable for a frequency-to-voltage converter, can be solved by the arrangement shown in FIG. 7. That is, the difficulty that as the signal interval is of the order of microseconds, several KHz, which is the signal variation is included in a range of error, can be eliminated.

In the above-described examples, a single moving object is arranged between a pair of stationary members in such a manner that they are in one and the same plane; however, the invention is not limited thereto or thereby. For instance, it is possible that stationary members are arranged in a plurality of parallel planes, respectively, and one moving object is arranged commonly for these stationary members, or a plurality of synchronously moving objects are provided for the stationary members, respectively.

In addition, the above-described arrangement may be so modified that the above-described moving object is set stationary, and instead the above-described stationary members are moved.

What is claimed is:

1. A device for sensing movement of a moving object comprising:
   (a) sensor means including a first electrode plate and a pair of second electrode plates confronting said first electrode plate to form therewith a pair of capacitors, one of (a) said first electrode plate and (b) said pair of second electrode plates being stationary and the other being adapted for movement with the object to be sensed, the confronting edge surfaces of said electrode plates having a plurality of equal-sized and equal-spaced cuts therein, the relation of the cuts of the edge surface of said first plate and the cuts of the edge surface of one of said second plates being shifted 180° in phase from the relation of the cuts of the edge surface of said first plate and the cuts of the edge surface of the other of said second plates, to cause the capacitance of one of said capacitors to increase and the capacitance of the other of said capacitors to correspondingly decrease differentially as said movable electrode plate moves in response to movement of the object to be sensed;
   (b) two oscillator circuits, each having an associated one of said capacitors incorporated therein as a frequency varying component; and
   (c) a mixer connected to said two oscillator circuits for providing a frequency difference signal determined by the difference in the frequencies of said two oscillator circuits and indicative of the extent of movement of the movable object.

2. A device as claimed in claim 1 in which said first electrode plate is movable and said pair of second electrode plates is stationary.

3. A device as claimed in claim 1 in which said first electrode plate is stationary and said pair of second electrode plates is movable.

4. A device as claimed in claim 1 in which the frequency of said mixer is increased and decreased linearly and alternately every unitary amount of relative movement between said first electrode plate and said pair of second electrode plates.

5. A device as claimed in claim 1, further comprising means for transmitting the outputs of said oscillators by wireless communication.

* * * * *